Jan. 5, 1926. Re. 16,243

H. E. MARKS

ROOF STRUCTURE

Original Filed August 31, 1920

Fig. 3,

Fig. 2,

INVENTOR
Herbert E. Marks
BY
Annis Davis Warren & Edmonds
ATTORNEYS

Reissued Jan. 5, 1926. REISSUED Re. 16,243.

UNITED STATES PATENT OFFICE.

HERBERT E. MARKS, OF GLEN OSBORNE, PENNSYLVANIA.

ROOF STRUCTURE.

Original No. 1,398,079, dated November 22, 1921, Serial No. 407,189, filed August 31, 1920. Application for reissue filed October 15, 1925. Serial No. 62,677.

*To all whom it may concern:*

Be it known that I, HERBERT E. MARKS, residing at Glen Osborne, in the county of Allegheny, State of Pennsylvania, have invented certain new and useful Improvements in Roof Structures; and I do hereby declare the following to be a full, clear, and exact description of the invention, such as will enable others skilled in the art to which it appertains to make and use the same.

This invention relates to roof structures. Its object is to provide a roof structure which is fire proof, which forms an efficient heat insulator, which is light in weight, low in cost, which can be easily and cheaply erected, and which nevertheless is strong and durable.

Generally stated the invention comprises a roof structure containing metallic angle members and a substantially monolithic and reinforced slab of gypsum or similar material, combined and assembled in the novel way hereinafter described.

Figure 1:
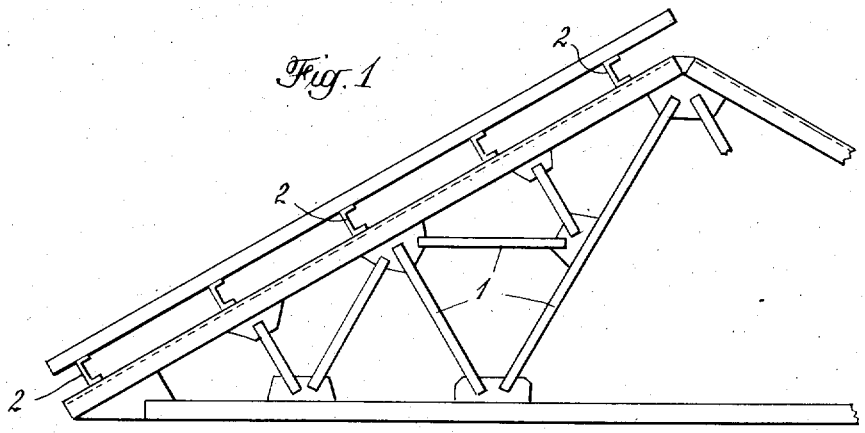
Figure 1:
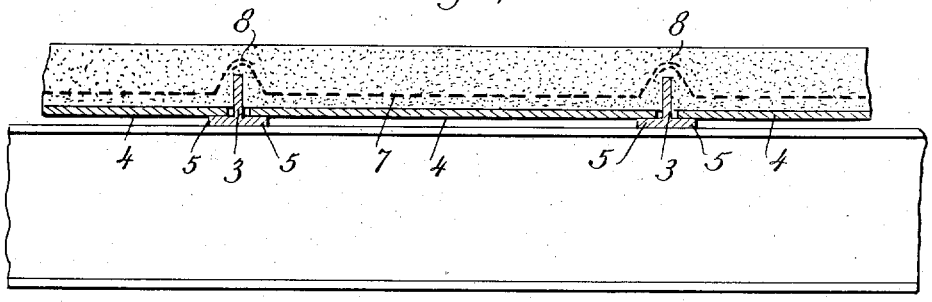
Figure 1:
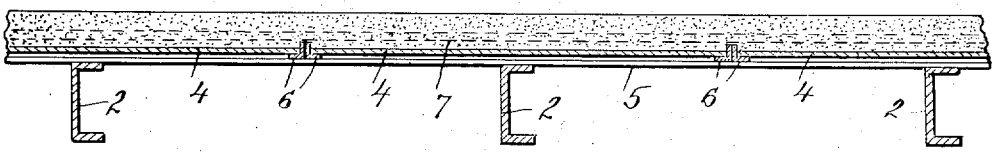

In the accompanying drawings Figure 1 is a vertical section of an inclined roof constructed in accordance with the invention; Fig. 2 shows a portion of Fig. 1 on an enlarged scale; and Fig. 3 is a section taken at right angles to that of Figs. 1 and 2 on a still larger scale.

The invention is applicable to a roof of any type, and in the drawings is shown as applied in a double sloping or ridge roof. In the drawings 1 indicates a suitable frame truss or part of the building on which the roof is supported and 2 indicates purlins for suppotring the roof structure proper. All of these parts are illustrated as formed of structural steel, and obviously can be of any material, character or design, depending upon the kind and size of the roof.

The roof structure proper comprises a plurality of angle bars, specifically of the type known as T-bars, 3, which rest with their base flanges upon the purlins and are suitably secured thereto and with their legs projecting upwardly. These T-bars form the base for the roof structure proper and will be spaced sufficiently close that the distance therein can be bridged by ordinary sizes of plaster or gypsum boards, which are articles of commercial manufacture and sale, being generally composed of molded gypsum or the like, and generally are quite thin, usually about three-eighths of an inch in thickness. The plaster or gypsum boards are shown at 4, having their side edges resting upon and supported by the horizontal flanges 5 of the T-bars 3, as shown in Fig. 3. These gypsum boards can be chosen of any suitable length, but preferable of a length substantially equal to the space between adjacent purlins 2, but instead of extending from purlin to purlin they are so placed that their central portions are substantially above purlins, with their end portions meeting about midway between adjacent purlins. To support the end portions of these plaster boards it is preferred to use small angle members 6, of a length equal to the distance between adjacent T-bars 3, and having their ends resting upon the flanges 5 of said T-bars, as a result of which the thin plaster boards are supported not only at their side edges but also at their end edges. Obviously in lieu of the T-bars 3, a pair of angle bars or channels placed back to back may be utilized, and likewise instead of the angle bars 6 placed back to back as shown, small T-bars or channels may be used.

The plaster boards 4, placed in the manner described, serve as centering for the formation of the roof slab, and also as the lower facing of the roof slab. The roof slab is formed from suitable cementitious material, such as gypsum, which is mixed with the proper proportion of water and then molded directly in place, that is, by being poured upon the centering formed by the plaster boards 4. The composition of this cementitious material is preferably the same as that of the plaster boards but in any event is of such nature that when poured in place it bonds on to the plaster boards so that the latter and the solidified cementitious material form a unitary or monolithic slab.

Preferably this slab will be reinforced by embedding in the cementitious material suitable metallic reinforcement 7, preferably a metallic mesh, such as metallic lath, wire mesh, or the like. This metallic, reinforcement may be in the form of sheets extending across, and resting upon the upper edges of the angle bars 6 and being supported by the latter and thereby properly spaced from the plaster boards 4, the upward projection of the angle bars 6 preferably being somewhat greater than the thickness of the plaster boards, but terminating below the center of the upwardly projecting legs of the T bars, so that the metal reinforcement will be embedded close to the lower face of the slab. This metallic mesh will be either one continuous strip extending from the eaves to the ridge of the roof, or may be composed of a number of pieces, the ends of which are overlapped so that when embedded in the cementitious material it has the same reinforcing effect as though a continuous strip of material were used; also if desired, the edge portions of the metallic reinforcement may be bent upwardly and made to overlap the upper edges of the T bars 3, as shown at 8, Fig. 3, so as to also secure a continuous, additional transverse tie; or the strips of reinforcement may run across the T bars 3, and bend down between the T bars, with their edges overlapping to give in effect a continuous reinforcement, when embedded in the cementitious material, from eave to ridge and also transversely of the roof. The cementitious material which is poured onto the centering plaster boards 4 readily passes through this metal mesh and bonds to the plaster boards. Such material will be filled in to a depth somewhat greater than that of the T bars 3 so that no portion of the metal frame is exposed on the top surface.

The roof structure described is of simple construction, is easy and cheap to construct, is light, and with all is very strong, inasmuch as the entire structure, including the plaster boards, forms a monolithic slab which is reinforced for its entire length and width, and is, therefore, capable of standing a very considerable load. This slab is reinforced not only by the metal mesh described, but also by the T bars 3 and angle bars 6 which become thoroughly embedded and bonded in the cementitious material. The consequence is that the metal members can be of light cross section, and the slab of minimum thickness.

Since the plaster boards which form the bottom surface of this slab serve as centering, the usual centering for erecting roofs of this kind can be entirely dispensed with, thus making a great saving in cost of erection.

The top surface of this roof structure will be suitably water-proofed by any of the usual water-proofing methods, such as by applying thereto a coating of asphaltum or the like, and can be finished in any desired way of finishing roofs of this kind, such as by providing the same with a gravel or other surface.

In case the cementitious material is such as to form a strong slab, such as cement, the members 4 need not necessarily be of a composition to bond with the cementitious material, but may be of the so-called commercial "beaver board" or like thin board.

I claim:

1. A roof of the character described comprising purlins, metal angle members supported on the purlins and presenting oppositely projecting flanges, small metal angle members located intermediate the purlins and extending between the first named angle members and resting on the flanges of the latter, and also presenting oppositely projecting flanges, thin composition boards supported at their sides on the flanges of the first named angle members and at their ends on the flanges of the second named angle members, metallic reinforcement supported on the second named angle members, and a cementitious slab molded in place on the composition boards to such thickness as to project materially above the first named angle members.

2. A roof of the character described, comprising purlins, metal angle members supported on the same and presenting oppositely projecting flanges, small metal angle members extending between the first named angle members and resting on the flanges of the latter and also presenting oppositely projecting flanges, plaster boards supported on their side edges on the flanges of the first named angle members and at their end edges on the flanges of the second named angle members, and a cementitious body molded in place on the plaster boards and bonding therewith and extending above the said first named angle members, thereby forming a monolithic roof slab.

3. A roof of the character described, comprising purlins, metal angle members supported on the purlins and presenting oppositely projecting flanges, plaster boards supported on said flanges, metal reinforcing fabric supported over and in spaced relation to said plaster boards and forming a continuous reinforcement for the length of said angle members, means for holding adjacent edges of said plaster boards substantially in alignment with each other, and a cementitious body molded onto the plaster boards and bonding therewith and of a depth materially greater than said angle members, thereby forming a monolithic roof slab including the plaster boards cementitious body, metal reinforcement, and the means for holding adjacent edges of said boards in alignment.

4. A roof of the character described, comprising purlins, metal angle members supported on the purlins and presenting oppositely projecting flanges, plaster boards supported on said flanges, metal reinforcing fabric supported over and in spaced relation to said plaster boards and forming a continuous reinforcement for the length of said angle members, transverse supporting means for holding adjacent edges of said plaster boards substantially in alignment with each other, and a cementitious body molded onto the plaster boards and bonding therewith and of a depth materially greater than said angle members, thereby forming a monolithic roof slab including the plaster board, cementitious body, metal reinforcement and said transverse supporting means.

In testimony whereof I affix my signature.

HERBERT E. MARKS.